United States Patent
Matsuda et al.

(10) Patent No.: US 7,564,972 B2
(45) Date of Patent: Jul. 21, 2009

(54) ARITHMETIC DEVICE AND ENCRYPTION/DECRYPTION DEVICE

(75) Inventors: Hiromi Matsuda, Kanagawa (JP); Takafumi Hosoi, Tokyo (JP); Masao Tanaka, Kanagawa (JP); Takayasu Kon, Tokyo (JP)

(73) Assignee: Sony Corporation, Tokyo (JP)

( * ) Notice: Subject to any disclaimer, the term of this patent is extended or adjusted under 35 U.S.C. 154(b) by 926 days.

(21) Appl. No.: 10/481,239

(22) PCT Filed: Apr. 18, 2003

(86) PCT No.: PCT/JP03/05011

§ 371 (c)(1),
(2), (4) Date: Dec. 18, 2003

(87) PCT Pub. No.: WO03/090187

PCT Pub. Date: Oct. 30, 2003

(65) Prior Publication Data

US 2004/0196976 A1 Oct. 7, 2004

(30) Foreign Application Priority Data

Apr. 19, 2002 (JP) ............................. 2002-118508

(51) Int. Cl.
 H04K 1/06 (2006.01)
 H04K 1/00 (2006.01)
(52) U.S. Cl. .......................................... 380/37; 380/29
(58) Field of Classification Search ............. 380/28–29, 380/37; 713/174, 189
See application file for complete search history.

(56) References Cited

U.S. PATENT DOCUMENTS 4,100,374 A * 7/1978 Jayant et al. ................... 380/28
4,789,959 A * 12/1988 Hung et al. .................. 713/401

(Continued)

FOREIGN PATENT DOCUMENTS

JP 10-022990 1/1998

(Continued)

OTHER PUBLICATIONS

Tatsuaki Okamoto et al.: "Series/joho kagaku no sugaku gendai ango" Sangyo Tosho Kabushiki Kaisha, $2^{nd}$ print, pp. 82-84 Jun. 30, 1998.

*Primary Examiner*—Hosuk Song
(74) *Attorney, Agent, or Firm*—Oblon, Spivak, McClelland, Maier & Neustadt, P.C.

(57) ABSTRACT

Input data (plain text data or encrypted text data) are latched according to a clock CLK1 and, after initial transposition thereof, the data are outputted from a selector. The lower-order bits of the output data from the selector are processed through expanded transposition and then are calculated together with key data K1 in an XOR circuit, and the result data are latched according to a clock CLK2. The latched 48-bit data are divided into eight 6-bits data, each of which is then replaced with 4-bit data, and after combination thereof, the data are transposed. In the calculations of second and subsequent stages, the data obtained through replacement and combination in a replacement/combination circuit are latched according to the clock CLK1 and then are outputted from the selector. And after completion of the 16th-stage calculation, the data replaced in a replacement circuit are inversely transposed.

20 Claims, 5 Drawing Sheets

U.S. PATENT DOCUMENTS

| | | | | |
|---|---|---|---|---|
| 4,870,345 A | * | 9/1989 | Tomioka et al. | 714/731 |
| 5,974,102 A | * | 10/1999 | Eo et al. | 375/354 |
| 6,917,684 B1 | * | 7/2005 | Tatebayashi et al. | 380/44 |
| 2002/0131595 A1 | * | 9/2002 | Ueda et al. | 380/201 |
| 2002/0166058 A1 | * | 11/2002 | Fueki | 713/194 |
| 2003/0108195 A1 | * | 6/2003 | Okada et al. | 380/37 |

FOREIGN PATENT DOCUMENTS

| | | |
|---|---|---|
| JP | 10-22990 | 1/1998 |
| JP | 10-333569 | 12/1998 |
| JP | 2000-4147 | 1/2000 |

* cited by examiner

ARITHMETIC DEVICE AND ENCRYPTION/DECRYPTION DEVICE

TECHNICAL FIELD

The present invention relates to a data calculating device and a data encryptor/decryptor for calculation of data to encrypt and/or decrypt the data.

BACKGROUND ART

Figure 5:
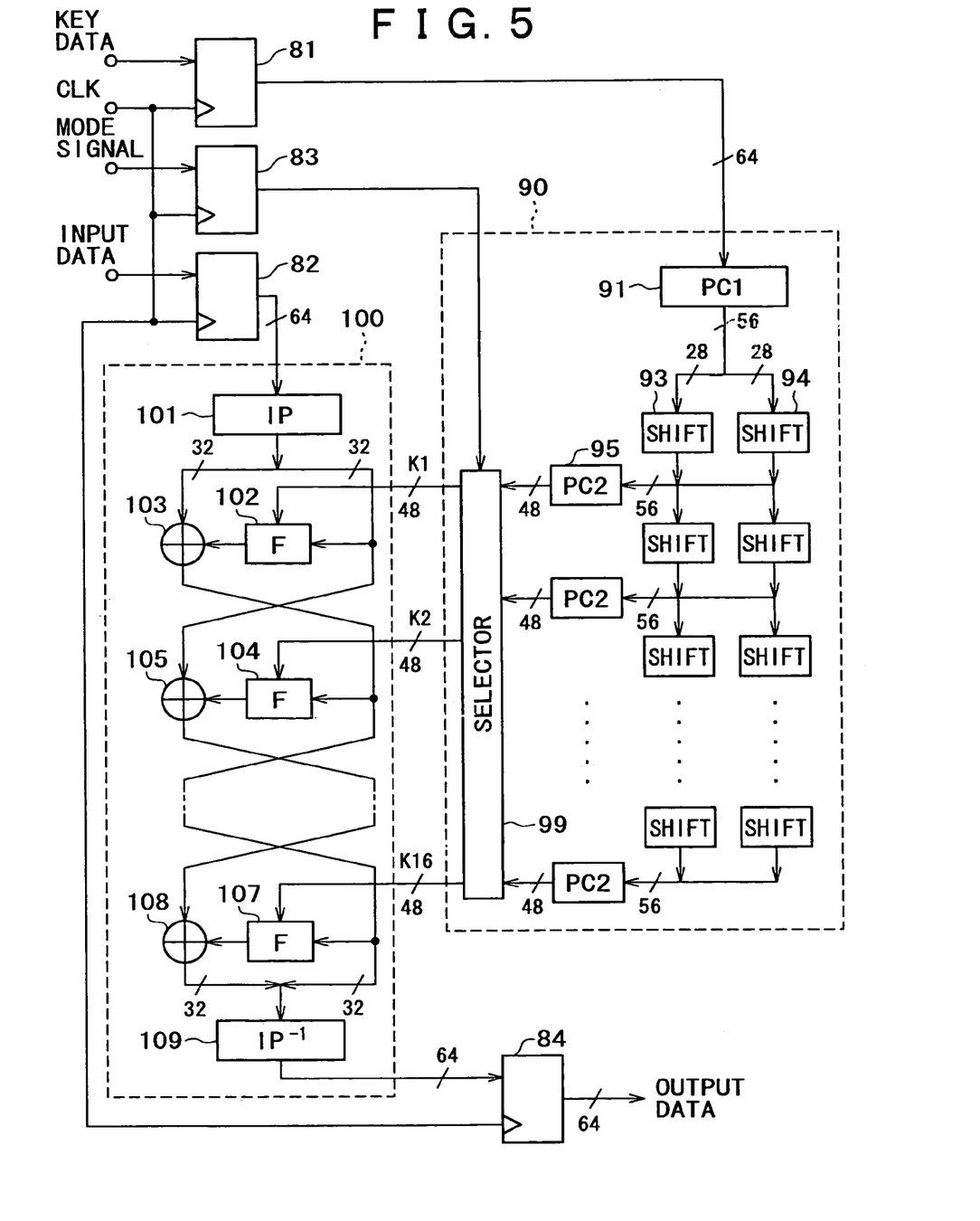
FIG. 5 is a block diagram showing a conventional encryption/decryption calculating device.

A device shown in FIG. 5 is contrived as an encryptor/decryptor conforming with an encryption algorithm of DES (Data Encryption Standard).

Key data (secret key) and input data (plain text data or encrypted text data) are each composed of 64 bits and are latched in latch circuits 81 and 82, respectively, according to a clock CLK. And a mode signal indicative of encryption or decryption is latched in a latch circuit 83 according to the clock CLK.

The key data outputted from the latch circuit 81 are supplied to a key generator 90, and the key data K1 to K16 of 16 stages each composed of 48 bits are outputted sequentially from the key generator 90.

More specifically, the 64-bit key data outputted from the latch circuit, 81 are converted into 56-bit key data in a conversion circuit 91, and higher-order 28-bit data and lower-order 28-bit data are shifted by 1 bit or 2 bits in shift circuits 93 and 94, and then are combined together to form 56-bit key data, which are converted into 48-bit key data in a conversion circuit 95, whereby first-stage key data are generated.

Thereafter similar bit shift and conversion are executed, so that key data of 16 stages are generated and then are inputted to a selector 99. Subsequently the selector 99 is controlled by the mode signal outputted from the latch circuit 83, and key data K1 to K16 of 16 stages each composed of 48 bits are outputted sequentially according to the pulses of the clock CLK.

The output data (plain text data or encrypted text data) from the latch circuit 82 are supplied to a calculator 100, where the following calculation is executed.

First, the 64-bit data outputted from the latch circuit 82 are transposed bit by bit in an initial transposition circuit 101, and the lower-order 32 bits out of the entire 64-bit data obtained after such initial transposition and the key data K1 are calculated together in a first-stage conversion circuit 102, and further after conversion by the use of a function F, the 32-bit data outputted from the conversion circuit 102 and the higher-order 32 bits out of the entire 64-bit data after the initial transposition are calculated together in an XOR (exclusive OR) circuit 103.

Subsequently, the 32-bit data outputted from the XOR circuit 103 and the key data K2 are calculated together in a second-stage conversion circuit 104, and after conversion by the use of a function F, the 32-bit data outputted from the conversion circuit 104 and the lower-order 32 bits out of the entire 64-bit data obtained after the initial transposition are calculated together in an XOR circuit 105.

Thereafter, similarly to the above, the higher-order 32 bits and the lower-order 32 bits are mutually replaced and, after execution of the calculations in the third and subsequent stages, the 32-bit data inputted to a 16th-stage conversion circuit 107 and the 32-bit data outputted from a 16th-stage XOR circuit 108 are combined with each other, and the 64-bit data obtained after such combination are transposed bit by bit in an inverse transposition circuit 109.

The 64-bit data after such inverse transposition are latched in a latch circuit 84 according to the clock CLK, and then either encrypted or decrypted data are outputted from the latch circuit 84.

However, in the encryption/decryption calculating device described above, the key generator 90 is an asynchronous circuit including none of latch circuit (sampling circuit), wherein 16-stage key data are generated at a time from the input key data and are merely selected by the selector 99, so that much noises (changes in the signal line potential) are superposed, in the vicinities of the change points, on the key data K1 to K16 outputted from the key generator 90, and therefore the power consumption in the calculator 100 is increased.

In view of such problems, an object of the present invention resides in realizing an improved calculating device which is adapted for remarkable decrease of the power consumption.

DISCLOSURE OF INVENTION

The calculating device of the present invention comprises first latch means for latching input data; first calculation means for calculating asynchronous data inputted from an asynchronous calculation circuit which performs an asynchronous operation, and also the input data latched in the first latch means; synchronizing means for synchronizing the calculated data outputted from the first calculation means; and a second calculation for further calculating the synchronized data obtained from the synchronizing means. In the calculating device of the above structure, the power consumption can be remarkably decreased and the circuit scale thereof is reducible.

BEST MODE FOR CARRYING OUT THE INVENTION

Figure 1:
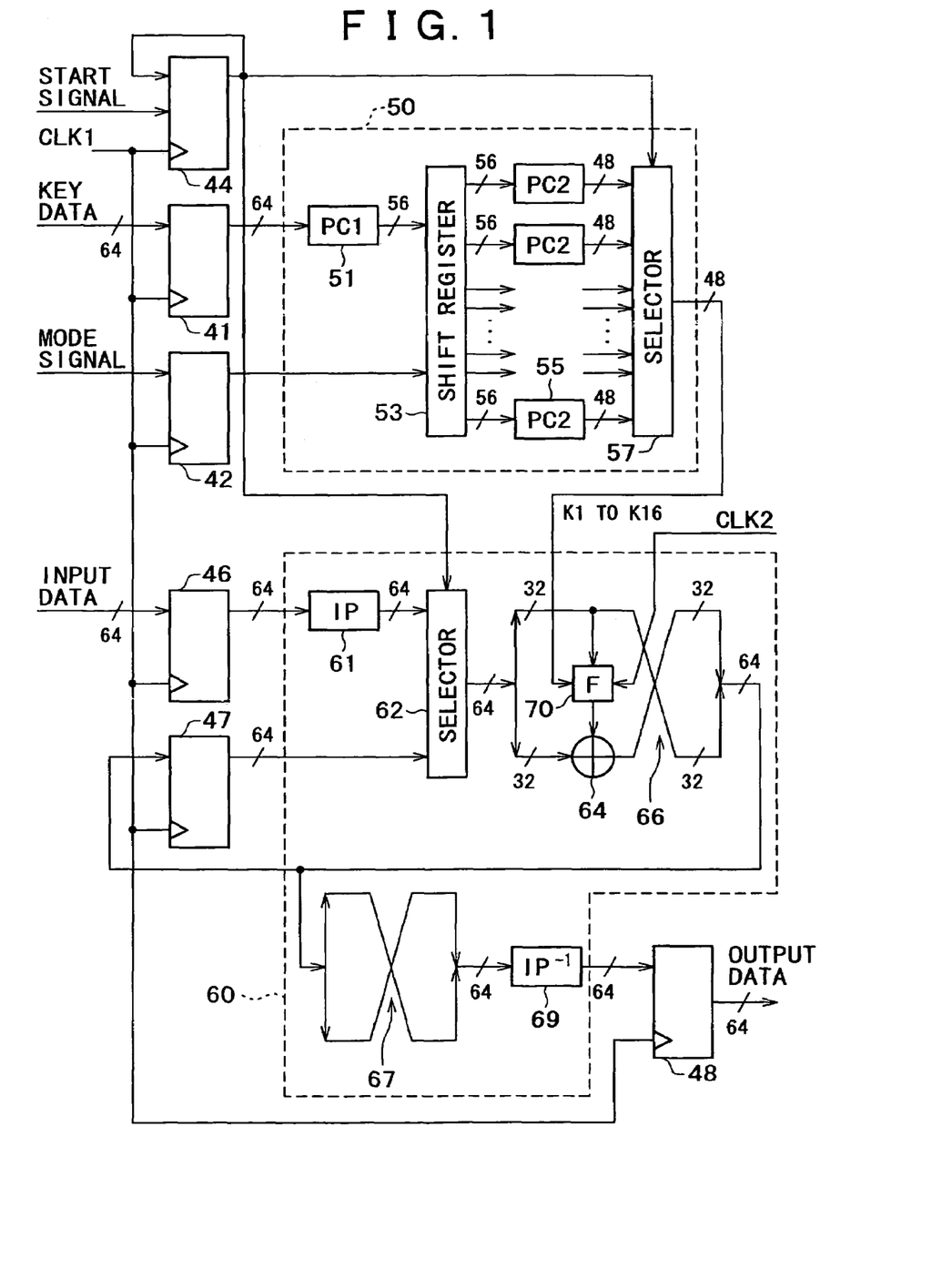
FIG. 1 is a block diagram showing an encryption/decryption calculating device as an embodiment which represents a calculating device of the present invention.
Figure 2:
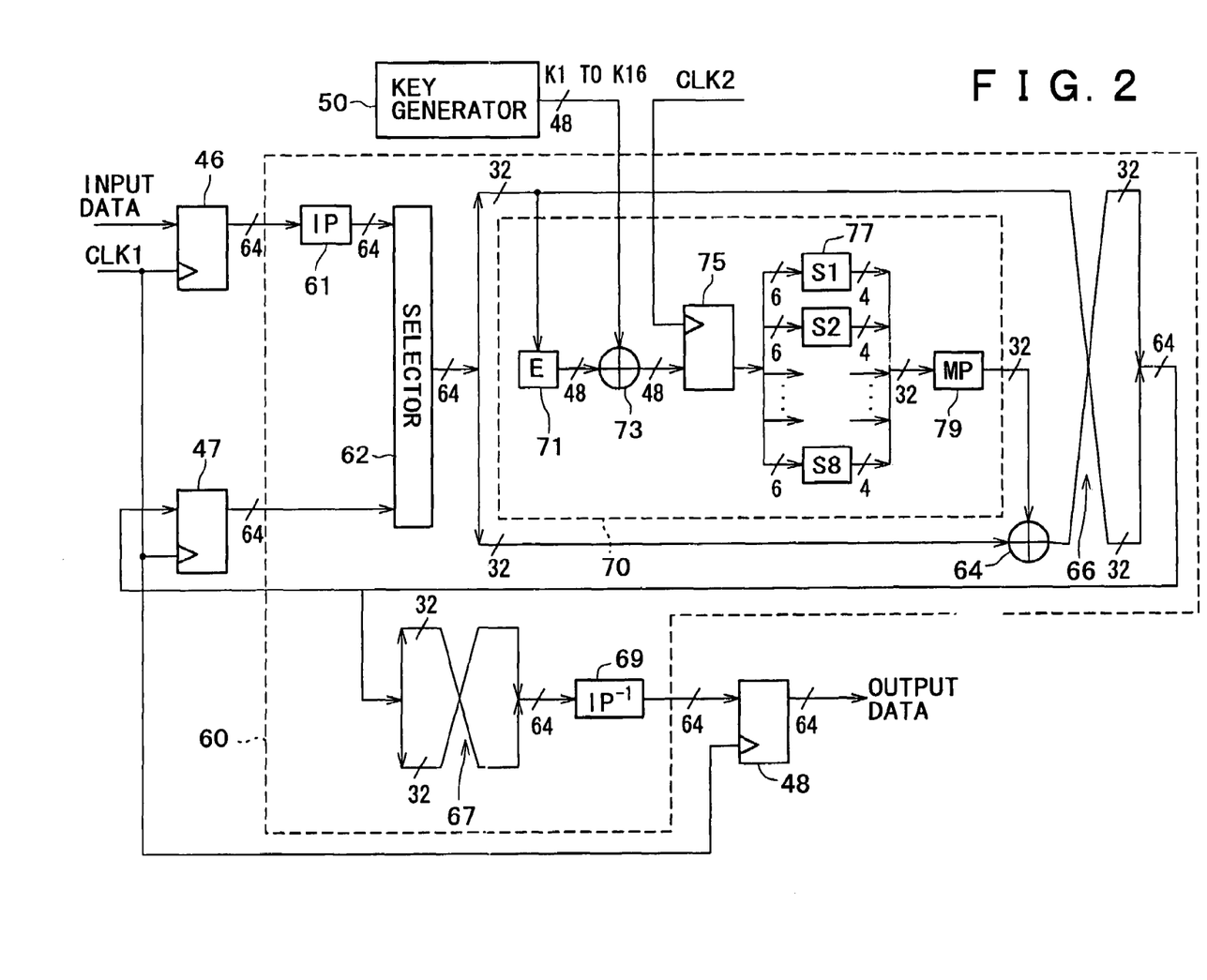
FIG. 2 is a block diagram showing principal components in the encryption/decryption calculating device of FIG. 1.
Figure 3:
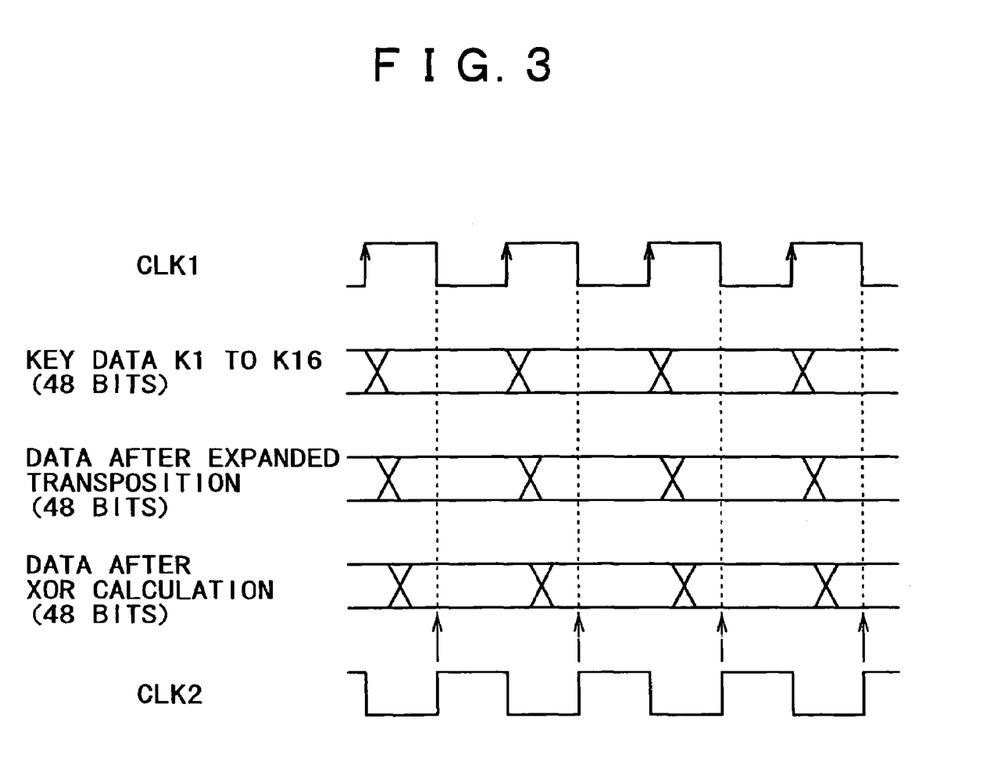
FIG. 3 is a diagram for explaining the operation performed in the encryption/decryption calculating device of FIG. 1.

Embodiment of Calculating Device: FIGS. 1 to 3

FIGS. 1 and 2 show an embodiment representing a calculating device of the present invention constructed as an encryption/decryption calculating device, wherein FIG. 2 shows details of a conversion circuit 70 in a calculator 60 included in FIG. 1.

An encryption algorithm adopted in the encryption/decryption calculating device of this embodiment conforms with the encryption algorithm of DES.

Key data (secret key) and input data (plain text data or encrypted text data) are each composed of 64 bits and are latched in latch circuits 41 and 46, respectively, according to a clock CLK1.

And a mode signal indicative of encryption or decryption is latched in a latch circuit 42 according to the clock CLK1.

Further, the clock CLK1 is counted by a 16-stage counter 44 from the time point of a start signal.

The key data outputted from the latch circuit 41, the mode signal outputted from the latch circuit 42 and the output signal from the counter 44 are supplied to a key generator 50, and key data K1 to K16 of sixteen stages each composed of 48 bits are outputted sequentially from the key generator 50.

More specifically, the 64-bit key data outputted from the latch circuit 41 are converted into 56-bit key data in a conversion circuit 51, and the 56-bit key data are shifted sequentially in a shift register 53, by one bit or two bits at a time, in accordance with the output signal of the latch circuit 42, whereby sixteen key data each composed of 56 bits are obtained.

Further, the sixteen 56-bit key data are each converted into 48-bit key data in a conversion circuit 55, and the sixteen 48-bit key data are sequentially selected, per pulse of the clock CLK1, in accordance with the output signal of the counter 44 in a selector 57, so that the aforementioned key data K1 to K16 are obtained sequentially per pulse of the clock CLK1.

Thus, in the key generator 50, there is performed a mere operation of generating 16-stage key data at a time from the input key data and selecting the data by the selector 57, wherein the key data K1 to K16 outputted from the key generator 50 are such that much noises (changes in the signal line potential) are superposed thereon in the vicinities of the change points.

The output data (plain text data or encrypted text data) from the latch circuit 46 are supplied to a calculator 60. This calculator 60 is so formed that the calculations of sixteen stages are repeated cyclically by a one-stage calculating circuit in a calculator 100 shown in FIG. 5.

That is, first the 64-bit data outputted from the latch circuit 46 are transposed bit by bit in an initial transposition circuit 61, and the 64-bit data after the initial transposition are outputted from a selector 62 controlled by the counter 44. Then the lower-order 32 bits out of the entire 64-bit data and the key data K1 are calculated together in a conversion circuit 70, where the data are converted by the use of a function F.

More specifically, in the conversion circuit 70, as shown in FIG. 2, the lower-order 32-bit data are transposed bit by bit-in an expanded transposition circuit 71, and the same bit is selected plural times so that the above data are converted into 48-bit data, and thereafter the 48-bit data thus obtained and the 48-bit key data K1 are calculated together in an XOR circuit 73.

Further the 48-bit data outputted from the XOR circuit 73 are latched in a latch circuit 75 according to a clock CLK2 different in phase from the foregoing clock CLK1.

Such operation of latching the output data of the XOR circuit 73 by the clock CLK2 different in phase from the clock CLK1 is performed for the reason that, since the output key data K1 to K16 of the key generator 50 and the output data of the expanded transposition circuit 71 are delayed from the change point (leading edge) of the clock CLK1 as shown in FIG. 3, the output data of the XOR circuit 73 are also delayed, and therefore, in case the output data of the XOR circuit 73 are latched according to the clock CLK1, the latched data are those preceding by one clock pulse. More concretely, for example, the clock CLK2 is set to be opposite in phase to the clock CLK1.

As the output data of the XOR circuit 73 are thus latched in the latch circuit 75, the aforementioned noises in the output key data K1 to K16 of the key generator 50 are absorbed, so that the potential of the output signal from the latch circuit 75 is varied merely at the change point of the clock CLK2, hence achieving a remarkable reduction of the power consumption in the circuits posterior to the latch circuit 75.

The 48-bit data outputted from the latch circuit 75 are divided into eight data each composed of six bits, and each of the 6-bit data is replaced with 4-bit data according to a look-up table 77.

Further, the eight 4-bit data after such replacement are combined together to form 32-bit data, which are then transposed bit by bit in a transposition circuit 79.

The processing mentioned above is executed completely in the conversion circuit 70 during the first-stage calculation. Subsequently, the 32-bit data outputted from the transposition circuit 79 and the higher-order 32-bit data in the entire 64-bit data outputted from the selector 62 after the initial transposition are calculated in the XOR circuit 64 as the first-stage calculation.

The calculation in the first stage is thus completed. Thereafter the 32-bit data inputted to the expanded transposition circuit 71 and the 32-bit data outputted from the XOR circuit 64 are combined together to form 64-bit data in such a manner that the higher-order 32 bits and the lower-order 32 bits are replaced mutually in a replacement/combination circuit 66, and the 64-bit data obtained after such combination are latched in the latch circuit 47 according to the clock CLK1.

In the calculation executed in each of the second and subsequent stages, the output 64-bit data of the latch circuit 47 are outputted from the selector 62 instead of the output data from the initial transposition circuit 61, and the key data K2 or subsequent key data are inputted, instead of the key data K1, to the XOR circuit 73 in the conversion circuit 70, and the same calculation as the first-stage calculation is executed.

After completion of the calculation in the 16th stage, replacing the higher-order 32 bits and the lower-order 32 bits in the replacement/combination circuit 66 is no longer necessary, and therefore the 64-bit data obtained after the replacement and combination in the circuit 66 are supplied to a replacement circuit 67, where the higher-order 32 bits and the lower-order 32 bits are replaced with each other, and then the data are transposed bit by bit in an inverse transposition circuit 69.

The 64-bit data after such inverse transposition are latched in the latch circuit 48 according to the clock CLK1, and then encrypted or decrypted data are outputted from the latch circuit 48.

In the encryption/decryption calculating device of this embodiment, the power consumption is remarkably decreased as mentioned. Moreover, since the calculator 60 is so structured that calculations of 16 stages are executed through cyclic repetition by the one-stage calculating circuit, the number of gates in the calculating apparatus can be decreased to consequently reduce the circuit scale.

The embodiment described above represents an exemplary case of complying with the DES encryption algorithm. However, it is not exactly necessary to comply with the DES encryption algorithm alone, and some modifications may be made by changing the bit lengths of the input data (plain text data or encrypted text data) and the key data, or increasing the number of stages of calculations.

Figure 4:
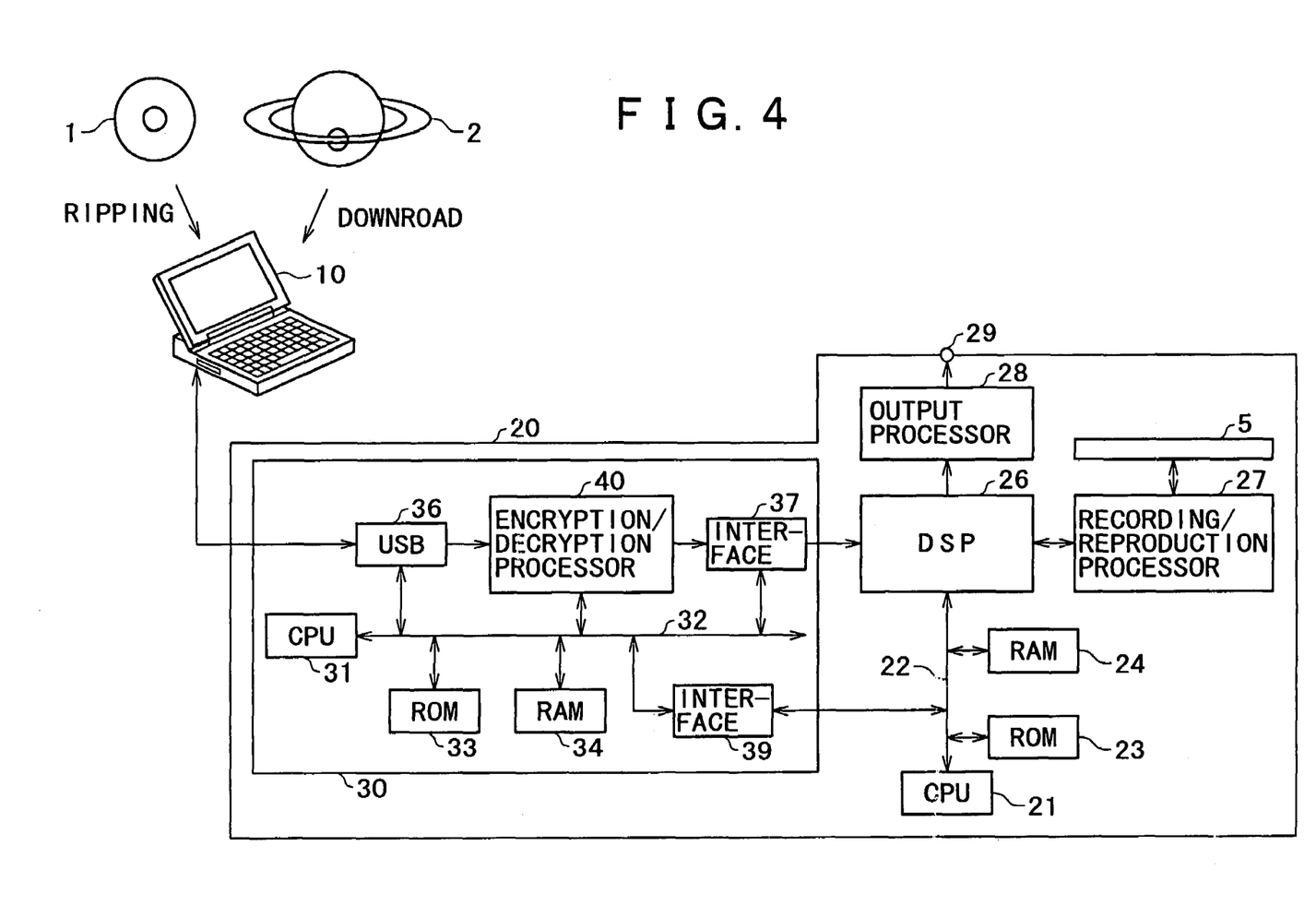
FIG. 4 is a block diagram showing a data recording/reproducing apparatus as an embodiment of a data receiver of the present invention.

Embodiment of Data Receiver: FIG. 4

FIG. 4 shows a data receiving system including a recording/reproducing apparatus as an embodiment of a data receiver of the present invention which is equipped with the encryption/decryption calculating device of the invention.

In the data receiving system of this example, encoded data encrypted by a secret key are received in a terminal unit 10 such as a PC through ripping from a recording medium 1 or down-loading from a delivery system 2 using the Internet.

The encrypted data thus received are transmitted from the terminal unit 10 to a recording/reproducing apparatus 20 connected to a USB (Universal Serial Bus) terminal of the terminal unit 10.

The recording/reproducing apparatus 20 records the data on a recording medium 5 and reproduces the data therefrom. The apparatus 20 is equipped with an encryptor/decryptor 30.

The encryptor/decryptor 30 comprises an encryption/decryption processor 40 consisting of the aforementioned encryption/decryption calculating device shown in FIGS. 1 and 2, and also comprises a CPU 31 with a bus 32 which connects thereto a ROM 33 where programs and required fixed data are written for transfer of commands to be executed by the CPU 31 and also for encryption and decryption of the data, a RAM 34 functioning as a work area of the CPU 31, a USB interface 36 for transferring the command from and/or to the terminal unit 10 and acquiring the data from the terminal unit 10, an interface 37 for outputting the data to a DSP (Digital Signal Processor) 26 of the recording/reproducing apparatus, and an interface 39 for transferring the command from and/or to the CPU 21 of the recording/reproducing apparatus.

The encryptor/decryptor 30 is formed into a one-chip LSI (Large Scale Integration).

In the recording/reproducing apparatus, there are connected, to a bus 22 of a CPU 21, a ROM 23 where programs to be executed by the CPU 21 and required fixed data are written, a RAM 24 functioning as a work area of the CPU 21, and the aforementioned DSP 26. And further a recording/reproduction processor 27 and an output processor 28 are connected to the DSP 26.

In the encryptor/decryptor 30, the encoded data encrypted by the secret key and inputted from the terminal unit 10 via the USB interface 36 are decrypted as mentioned in the encryption/decryption processor 40, and the encoded data as decrypted plain text data are sent to the DSP 26 via the interface 37, and after being processed in the DSP 26, the data are recorded on the recording medium 5 by the recording/reproduction processor 27 or are delivered to the output terminal 29 after conversion into analog signal by the output processor 28.

The recording medium 5 may be any of optical disk, hard disk, flexible disk, magnetic tape, memory card and semiconductor memory.

The present invention is applicable not only to such recording/reproducing apparatus but also to an apparatus having no recording function and capable of merely receiving, decrypting and reproducing the encrypted data.

INDUSTRIAL APPLICABILITY

According to the present invention, as described hereinabove, it becomes possible to realize an improved calculating device where the power consumption is remarkably decreased.

The invention claimed is:

1. A calculating device, comprising:
   first means for latching input data;
   a calculation unit configured to perform a calculation on asynchronous data input from an asynchronous calculation circuit, the calculation unit including
   an expanded transposition circuit configured to transpose and expand data from a first predetermined number of bits to a second predetermined number of bits larger than the first predetermined number, and
   a XOR circuit configured to receive the asynchronous data and data output from the expanded transposition circuit and to provide a calculated output;
   second means for latching the calculated output;
   means for performing a calculation on data output from the second means for latching;
   third means for latching data output from said means for performing the calculation; and
   means for selecting the input data latched in said first means for latching or the data latched in said third means for latching, based on a number of selections performed by said means for selecting, wherein
   said calculation unit is configured to execute a predetermined calculation on the data selected by said means for selecting, which is either the input data latched in said first means for latching or the data latched in said third means for latching, and the asynchronous data input from said asynchronous calculation circuit.

2. The calculating device according to claim 1, wherein said first means for latching has a latch timing that is different from a latch timing of said second means for latching.

3. The calculating device according to claim 1, wherein said third means for latching latches data calculated a plurality of times by said calculation unit and said means for performing the calculation.

4. The calculating device according to claim 1, wherein said means for selecting selects the input data latched in said first means for latching or the data latched in said third means for latching, based on a timing that is different from a latch timing of said second means for latching.

5. The calculating device according to claim 1, wherein said means for selecting selects the input data latched in said first means for latching or the data latched in said third means for latching, based on a latch timing of said first means for latching.

6. The calculating device according to claim 1, wherein said means for selecting selects the input data latched in said first means for latching or the data latched in said third means for latching, based on a latch timing of said first means for latching, which is different from a latch timing of said second means for latching.

7. A calculating device, comprising:
   a first latching unit configured to latch input data;
   a calculation unit configured to perform a calculation on asynchronous data input from an asynchronous calculation circuit, the calculation unit including
   an expanded transposition circuit configured to transpose and expand data from a first predetermined number of bits to a second predetermined number of bits larger than the first predetermined number, and
   a XOR circuit configured to receive the asynchronous data and data output from the expanded transposition circuit and to provide a calculated output;
   a second latching unit configured to latch the calculated output;
   a calculating unit configured to perform a calculation on data output from the second latching unit;
   a third latching unit configured to latch data output from said calculating unit; and
   a selecting unit configured to select the input data latched in said first latching unit or the data latched in said third latching unit, based on a number of selections performed by said selecting unit, wherein
   said calculation unit is configured to execute a predetermined calculation on the data selected by said selecting unit, which is either the input data latched in said first latching unit or the data latched in said third latching unit, and the asynchronous data input from said asynchronous calculation circuit.

8. The calculating device according to claim 7, wherein said first latching unit is configured to have a latch timing that is different from a latch timing of said second latching unit.

9. The calculating device according to claim 7, wherein said third latching unit is configured to latch data calculated a plurality of times by said calculation unit and said calculating unit.

10. The calculating device according to claim 7, wherein said selecting unit is configured to select the input data latched in said first latching unit or the data latched in said third latching unit, based on a timing that is different from a latch timing of said second latching unit.

11. The calculating device according to claim 7, wherein said selecting unit is configured to select the input data latched in said first latching unit or the data latched in said third latching unit, based on a latch timing of said first latching unit.

12. The calculating device according to claim 7, wherein said selecting unit is configured to select the input data latched in said first latching unit or the data latched in said third latching unit, based on a latch timing of said first latching unit, which is different from a latch timing of said second latching unit.

13. The calculating device according to claim 7, wherein said first latching unit comprises a processor configured to transpose said input data bit by bit.

14. A method, comprising:
latching input data;
performing a calculation on asynchronous data input from an asynchronous calculation circuit, the performing the calculation including
transposing and expanding data from a first predetermined number of bits to a second predetermined number of bits larger than the first predetermined number, and
performing an operation on the asynchronous data and the transposed and expanded data using an XOR circuit to provide a calculated output;
latching the calculated output;
calculating a result based on data output from the latching the calculated output;
latching the result; and
selecting the input data latched in the latching the input data or the data latched in the latching the result, based on a number of selections performed by said selecting, wherein
the performing the calculation includes executing a predetermined calculation on the data selected by the selecting, which is either the input data latched in the latching the input data or the data latched in the latching the result, and the asynchronous data input from the asynchronous calculation circuit.

15. The method according to claim 14, wherein said latching the input data has a timing that is different from a timing of said latching the calculated output.

16. The method according to claim 14, wherein said latching the result latches data calculated a plurality of times by said performing the calculation and said calculating.

17. The method according to claim 14, wherein said selecting is based on a timing that is different from a timing of said latching the calculated output.

18. The method according to claim 14, wherein said selecting is based on a timing of said latching the input data.

19. The method according to claim 14, wherein said selecting is based on a timing of said latching the input data, which is different from a timing of said latching the calculated output.

20. The method according to claim 14, wherein said latching the input data comprises includes transposing said input data bit by bit.

* * * * *